July 28, 1942. E. J. CARSON 2,291,148

PIPE HANGER

Filed June 12, 1940

Inventor
Edward J. Carson,
By Christian L. Nielsen
Attorney

Patented July 28, 1942

2,291,148

UNITED STATES PATENT OFFICE 2,291,148

PIPE HANGER

Edward J. Carson, Youngstown, Ohio

Application June 12, 1940, Serial No. 340,214

2 Claims. (Cl. 248—54)

This invention relates to a pipe hanger, and it consists in the constructions, arrangements and combinations herein described and claimed.

It is the cardinal object of the invention to provide a pipe hanger of novel and simple construction comprising a resilient cushion seat for the pipe, the seat functioning to frictionally bind upon the pipe to maintain it against vibrations and "hammering" when liquid under pressure passes through the pipe supported by the hangers.

A further object of the invention is the novel construction of pipe seat adapting its installation upon a hanger by a molding operation or its installation on the hanger after being molded.

Additional objects, advantages and features of invention will be apparent from the following description considered in conjunction with the accompanying drawing, wherein Figure 1 is a perspective view of a hanger in use.

There has been more or less an adoption of copper pipes for water systems in dwellings, apartments and buildings generally, but one difficulty with such installations is that due to the lightness of the pipes, or otherwise, there is a decided vibration of the pipes causing a hammering or knocking against the support means for the pipes, causing a decided annoyance to occupants of the dwelling.

I have therefore devised a novel hanger and resilient seat for such pipes, although not limited thereto, in which vibration is practically eliminated.

Figure 1:
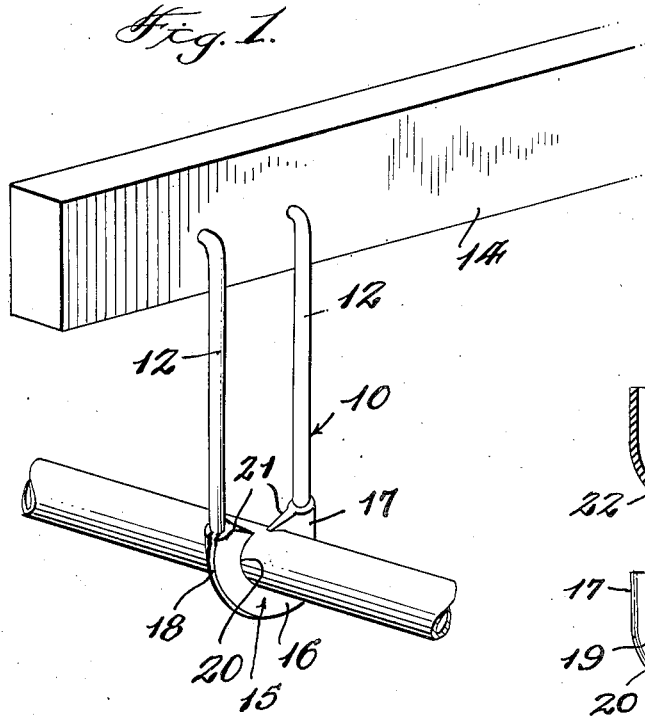

In carrying out the invention, I provide a hanger 10 substantially U-shaped, having a bight portion 11 and a pair of parallel leg members 12. Adjacent the extremities of the legs they are bent at right angles and provided with sharpened points 13 for penetration of a support means 14 as indicated in Figure 1.

As shown in Figures 1 to 5, the pipe seat or cushion is indicated at 15, formed of rubber or similar resilient material. The seat 15 is U-shaped, the bight portion 16 of which is of a size to snugly seat within the bight 11 of the hanger 10, the bight portion 16 having leg portions 17 adapted to embrace portions of the legs 12 of the hanger. As clearly shown in Figures 3, 4, and 5, the seat 15 is provided with a slot 18 upon its outer periphery of a width less than the circumference of the legs 12 of the hanger, the slot 18 forming communication with an annular channel 19, medially of the seat 15. In order to apply the seat to the hanger, it is merely necessary to present the slot 18 so as to register with the legs 12 and the bight portion 11 and then pressing the seat into position within the bight 16. This will be possible by reason of the resilience of the seat material, and further, after the seat is installed upon the hanger, the resilience of the seat will maintain the same in proper position for reception of a pipe to be supported.

It is desirable that the pipe be firmly held within the seat and to this end, the seat 15 is formed as a partial annulus 20 of a diameter slightly less than the pipe to be supported therein, and at the upper inner extremities of the legs 17 opposed lugs 21 are formed, inwardly extended so as to lie snugly upon the upper periphery of a pipe. The lugs 21 are sufficiently resilient to permit lateral flexing, as will be required when being engaged upon a pipe and after seating thereof, to flex to their normal positions above the pipe.

Obviously the hangers and associated seats may be applied to old or new piping installations.

Figure 6:
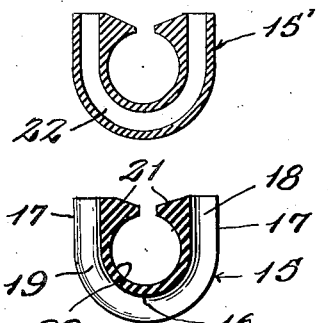
Figure 6 is a vertical sectional view of a modified form of seat.
Figure 4:
Figure 4 is a vertical section through the seat.
Figure 2:
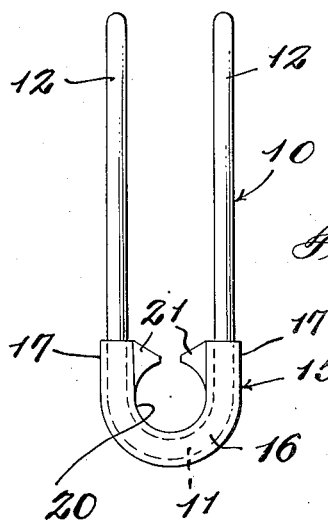
Figure 2 is a plan view of a hanger having my cushion seat installed thereon.
Figure 3:
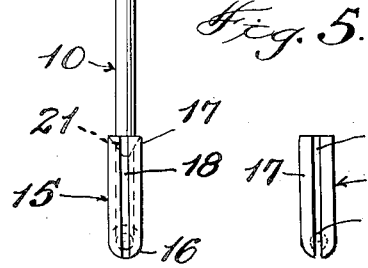
Figure 3 is a side elevation thereof.
Figure 5:
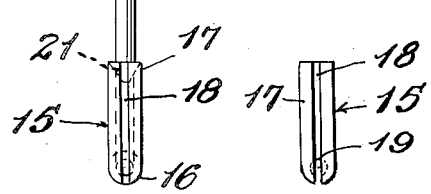
Figure 5 is an edge view of the cushion seat.

In Figure 6 I have shown the seat 15' as embodying a continuous bore 22 through which the hanger may be inserted, or which may be molded directly to the hanger as found desirable, or practical.

While I have shown and described preferred constructions, this is by way of illustration only, and I consider as my own all such modifications in structure as fairly fall within the scope of the appended claims.

I claim:

1. A pipe hanger having supporting legs and a bight portion, a resilient seat complemental to and engaged upon the bight portion, said seat having opposed lugs stopping short of the vertical axis of the seat whereby to engage and partially overlie an engaged pipe positioned in the seat.

2. A pipe hanger having a pair of supporting legs and a bight portion, a seat for the bight portion comprising a partial annulus of resilient material and having a pair of leg members, said partial annulus and leg members having a continuous slot upon their outer peripheries for reception of the leg members and bight portion of the hanger, the inner portion of the legs of the seat being provided with opposed lugs stopping short of the vertical axis of the seat whereby to engage and partially overlie an engaged pipe positioned within the seat.

EDWARD J. CARSON.